United States Patent
Carames

(10) Patent No.: US 10,057,271 B2
(45) Date of Patent: Aug. 21, 2018

(54) SOCIAL MEDIA LOGIN AND INTERACTION MANAGEMENT

(71) Applicant: Quest Software Inc., Aliso Viejo, CA (US)

(72) Inventor: Hugo Vazquez Carames, Barcelona (ES)

(73) Assignee: SONICWALL INC., Milpitas, CA (US)

( * ) Notice: Subject to any disclaimer, the term of this patent is extended or adjusted under 35 U.S.C. 154(b) by 0 days.

(21) Appl. No.: 15/602,483

(22) Filed: May 23, 2017

(65) Prior Publication Data

US 2017/0257374 A1    Sep. 7, 2017

Related U.S. Application Data

(63) Continuation of application No. 14/815,866, filed on Jul. 31, 2015.

(51) Int. Cl.
*H04L 29/06* (2006.01)
*G06F 21/31* (2013.01)

(52) U.S. Cl.
CPC ............ *H04L 63/102* (2013.01); *G06F 21/31* (2013.01); *H04L 63/02* (2013.01); *H04L 63/0884* (2013.01); *H04L 63/10* (2013.01); *H04L 63/20* (2013.01)

(58) Field of Classification Search
CPC .......... G06F 21/31; G06F 21/41; G06F 21/45; G06F 21/62; G06F 21/629; H04L 63/10; H04L 63/101; H04L 63/102; H04L 63/104
See application file for complete search history.

(56) References Cited

U.S. PATENT DOCUMENTS

| 7,310,815 | B2 | 12/2007 | Yanovsky |
| 7,545,748 | B1 | 6/2009 | Riddle |
| 7,620,988 | B1 | 11/2009 | Hernacki |
| 8,601,114 | B1 * | 12/2013 | Cooper .............. H04L 63/0245 370/328 |
| 9,485,231 | B1 | 11/2016 | Reese |

(Continued)

OTHER PUBLICATIONS

U.S. Appl. No. 14/665,315 Final Office Action dated Mar. 1, 2017.

(Continued)

*Primary Examiner* — Edward Zee
(74) *Attorney, Agent, or Firm* — Polsinelli LLP

(57) ABSTRACT

A hardware or software firewall may be installed within a private network. The firewall may intercept a first set of login credentials entered into a login interface of a social media platform. The firewall then checks that the first set of login credentials are correct against a first set of reference login credentials stored in a firewall memory, and sends a second set of login credentials to the login interface of the social media platform. This allows business employees to access a corporate social media profile from a private network but not outside the private network. The firewall can also limit social media interactions using the firewall by limiting the other profiles that a user's profile can interact with (e.g., using a whitelist, blacklist, or reputation score), by limiting communication types (e.g., using a whitelist or blacklist), by imposing firewall policies, or some combination thereof.

20 Claims, 10 Drawing Sheets

(56) References Cited

U.S. PATENT DOCUMENTS

| | | |
|---|---|---|
| 9,608,959 B2 | 3/2017 | Carames |
| 9,825,921 B2 | 11/2017 | Reese |
| 9,838,357 B2 | 12/2017 | Carames |
| 9,888,011 B2 | 2/2018 | Carames |
| 2004/0039940 A1 | 2/2004 | Cox et al. |
| 2005/0010816 A1 | 1/2005 | Yu et al. |
| 2005/0131997 A1 | 6/2005 | Lewis et al. |
| 2006/0085850 A1 | 4/2006 | Mayfield et al. |
| 2007/0271361 A1 | 11/2007 | Abzarian et al. |
| 2010/0034178 A1 | 2/2010 | Bhar |
| 2010/0192224 A1 | 7/2010 | Ferri et al. |
| 2011/0179362 A1 | 7/2011 | Craddock et al. |
| 2013/0094376 A1 | 4/2013 | Reeves |
| 2013/0125236 A1 | 5/2013 | Lalonde et al. |
| 2013/0290404 A1 | 10/2013 | Rajabi et al. |
| 2013/0291076 A1 | 10/2013 | Duryee et al. |
| 2014/0344928 A1 | 11/2014 | Sreedharan et al. |
| 2015/0007312 A1 | 1/2015 | Pidathala et al. |
| 2015/0074259 A1 | 3/2015 | Ansari et al. |
| 2015/0101008 A1* | 4/2015 | Zent ............... H04L 63/20 726/1 |
| 2015/0213259 A1 | 7/2015 | Du et al. |
| 2015/0288709 A1 | 10/2015 | Singhal et al. |
| 2016/0057045 A1 | 2/2016 | Gustin |
| 2016/0285824 A1 | 9/2016 | Carames |
| 2016/0285912 A1 | 9/2016 | Carames |
| 2017/0034179 A1 | 2/2017 | Carames |
| 2017/0118181 A1 | 4/2017 | Reese |
| 2017/0163687 A1 | 6/2017 | Carames |
| 2018/0048627 A1 | 2/2018 | Reese |
| 2018/0139179 A1 | 5/2018 | Ettema et al. |
| 2018/0159827 A1 | 6/2018 | Carames |

OTHER PUBLICATIONS

U.S. Appl. No. 14/665,315 Office Action dated Aug. 11, 2016.
U.S. Appl. No. 14/666,180 Final Office Action dated Aug. 22, 2016.
U.S. Appl. No. 14/666,180 Office Action dated Apr. 28, 2016.
U.S. Appl. No. 15/434,603 Office Action dated Mar. 24, 2017.
U.S. Appl. No. 14/815,866 Final Office Action dated Jun. 21, 2017.
U.S. Appl. No. 14/815,866 Office Action dated Jan. 12, 2017.
U.S. Appl. No. 14/665,315 Office Action dated Oct. 19, 2017.
U.S. Appl. No. 14/665,315 Final Office Action dated Jun. 4, 2018.

* cited by examiner

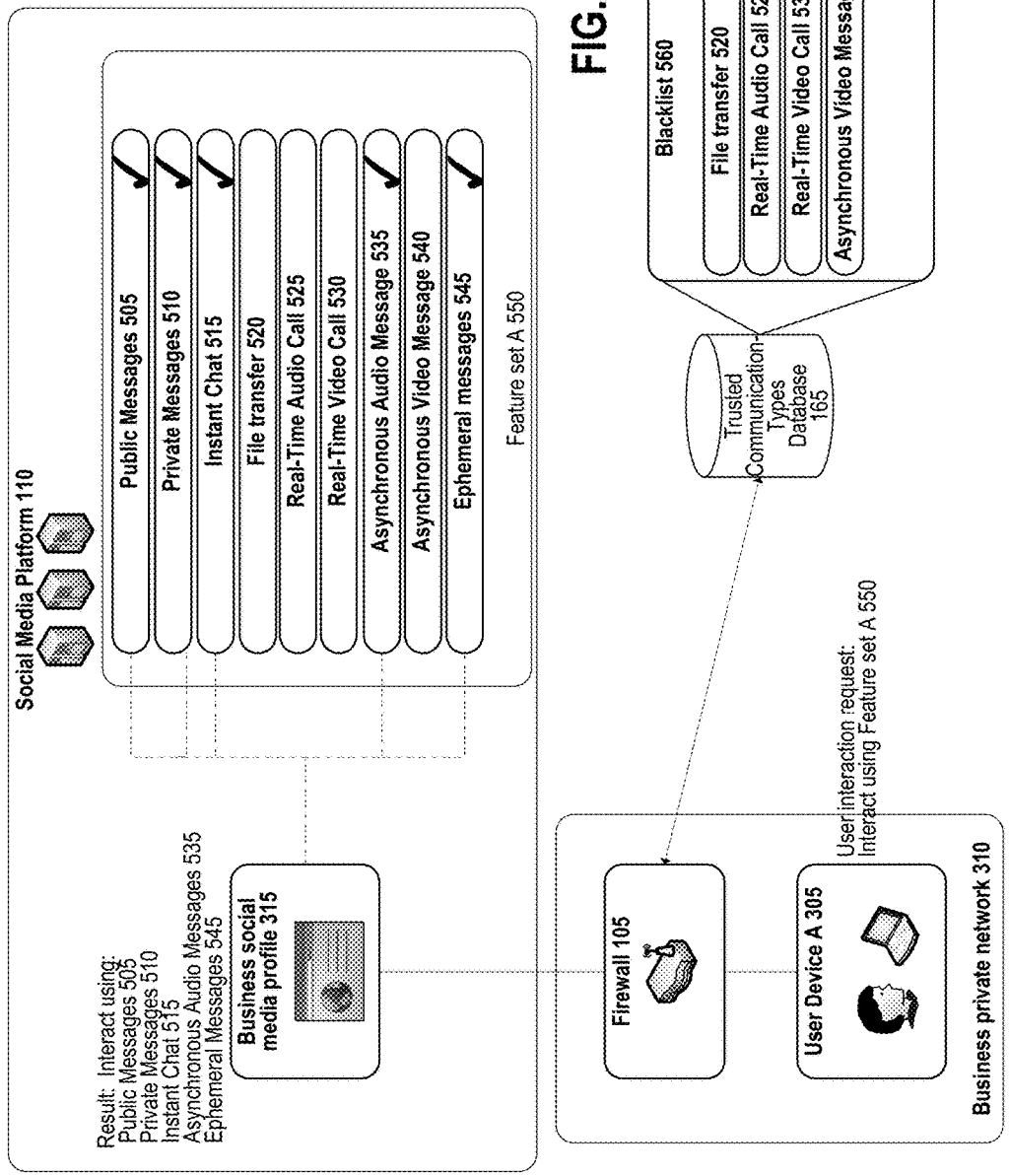

SOCIAL MEDIA LOGIN AND INTERACTION MANAGEMENT

CROSS-REFERENCE TO RELATED APPLICATIONS

This application is a continuation and claims the priority benefit of U.S. patent application Ser. No. 14/815,866 filed Jul. 31, 2015, now U.S. Pat. No. 9,888,011 the disclosure of which is incorporated herein by reference.

BACKGROUND OF THE INVENTION

1. Field of the Invention

The present invention generally relates to social media platform access management. More specifically, the present invention relates to use of an intermediary system such as a firewall to protect social network profiles from unauthorized access and to prevent users of a social media platform from using untrusted communication types or communicating with untrusted social media profiles.

2. Description of the Related Art

Private networks are often used by to share data between members of an organization or business without the shared data passing through the public Internet and potentially being access by a person outside of the organization or business. A private network can include e a wired local area network (LAN) or a wireless local area network (WLAN).

Social media platforms are based on media disseminated and sometimes created by users using the Internet. Typically, a user of a social media platform manages one or more profiles, where each profile includes a collection of media shared by the user. Each of the one or more profiles may represent the user, a group that the user represents, or an organization or business that the user represents. Some exemplary social media platforms include, but are not limited to, Facebook, Twitter, LinkedIn, Spotify, Apple Music, Reddit, Snapchat, and Pinterest.

As social media platforms have become more popular with consumers, more and more organizations and businesses have begun to create and manage social media profiles to represent the organization or business in order to more readily interact with consumers and fans. Typically, one or more specific organization members or business employees are tasked with managing such a profile, and are given the login credentials (e.g., the username or email used to log in, as well as the password). Granting full access in this way may cause problems for the organization or business, however, if such an organization member or business employee (or ex-member or ex-employee) decides to post negative content maliciously, such as by posting comments publicly disparaging the business' products after the employee is fired.

Similarly, more and more organizations and businesses have begun to encourage organization members and business employees to manage their personal social media profiles with an eye toward promoting the organization or business. However, such organizations or businesses typically have no control over the profiles of such organization members and business employees, and cannot prevent them from connecting their profiles to profiles that may pose a security threat (e.g., profiles associated with malicious hackers), profiles that may pose a financial threat (e.g., profiles of competitor businesses), or profiles that may pose a reputational threat (e.g., profiles of criminals or disreputable persons or groups).

Therefore, there is a need for improved social media a management infrastructure.

SUMMARY OF THE CLAIMED INVENTION

One exemplary method for network service access management includes receiving a first set of login credentials at a firewall from a user device, the first set of login credentials generated via a user input received through a login user interface of a network service platform presented at the user device. The method also includes determining that the first set of login credentials correctly matches a first set of reference login credentials stored in a firewall memory that is accessible by the firewall. The method also includes transmitting a second set of login credentials to the network service platform, the second set of login credentials stored in the firewall memory. The method also includes receiving a network service user interface from the network service platform, the network service user interface personalized for a profile associated with the second set of login credentials. The method also includes transmitting at least a subset of the network service user interface to the user device.

One exemplary system for social media interaction management includes a memory, the memory including firewall instructions, and a processor coupled to the memory. Executing a set of instructions stored in a memory by the processor performs a variety of system operations. The system operations may include receiving an interaction request destined for a social media platform from a user device that is logged into a first social media profile using the social media platform, the interaction request identifying at least a second social media profile and a communication type. The system operations may also include determining whether the identified second social media profile is a trusted social media profile. The system operations may also include determining whether the identified communication type is a trusted communication type. The system operations may also include determining whether the interaction request is to be sent onward to the social media platform based on whether the identified second social media profile is a trusted social media profile and whether the identified communication type is a trusted communication type.

One exemplary non-transitory computer-readable storage medium may have embodied thereon a program executable by a processor to perform a method for network service access management. The exemplary program method includes receiving a first set of login credentials at a firewall from a user device, the first set of login credentials generated via a user input received through a login user interface of a network service platform presented at the user device. The program method also includes determining that the first set of login credentials correctly matches a first set of reference login credentials stored in a firewall memory that is accessible by the firewall. The program method also includes transmitting a second set of login credentials to the network service platform, the second set of login credentials stored in the firewall memory. The program method also includes receiving a network service user interface from the network service platform, the network service user interface personalized for a profile associated with the second set of login credentials. The program method also includes transmitting at least a subset of the network service user interface to the user device.

BRIEF DESCRIPTION OF THE FIGS.

FIG. 5B illustrates social media communication operations in a social media ecosystem using a blacklist.

DETAILED DESCRIPTION

A hardware or software firewall may be installed within a private network. The firewall may intercept a first set of login credentials entered into a login interface of a social media platform. The firewall then checks that the first set of login credentials are correct against a first set of reference login credentials stored in a firewall memory, and sends a second set of login credentials to the login interface of the social media platform. This allows business employees to access a corporate social media profile from a private network but not outside the private network. The firewall can also limit social media interactions using the firewall by limiting the other profiles that a user's profile can interact with (e.g., using a whitelist, blacklist, or reputation score), by limiting communication types (e.g., using a whitelist or blacklist), by imposing firewall policies, or some combination thereof.

Figure 1:
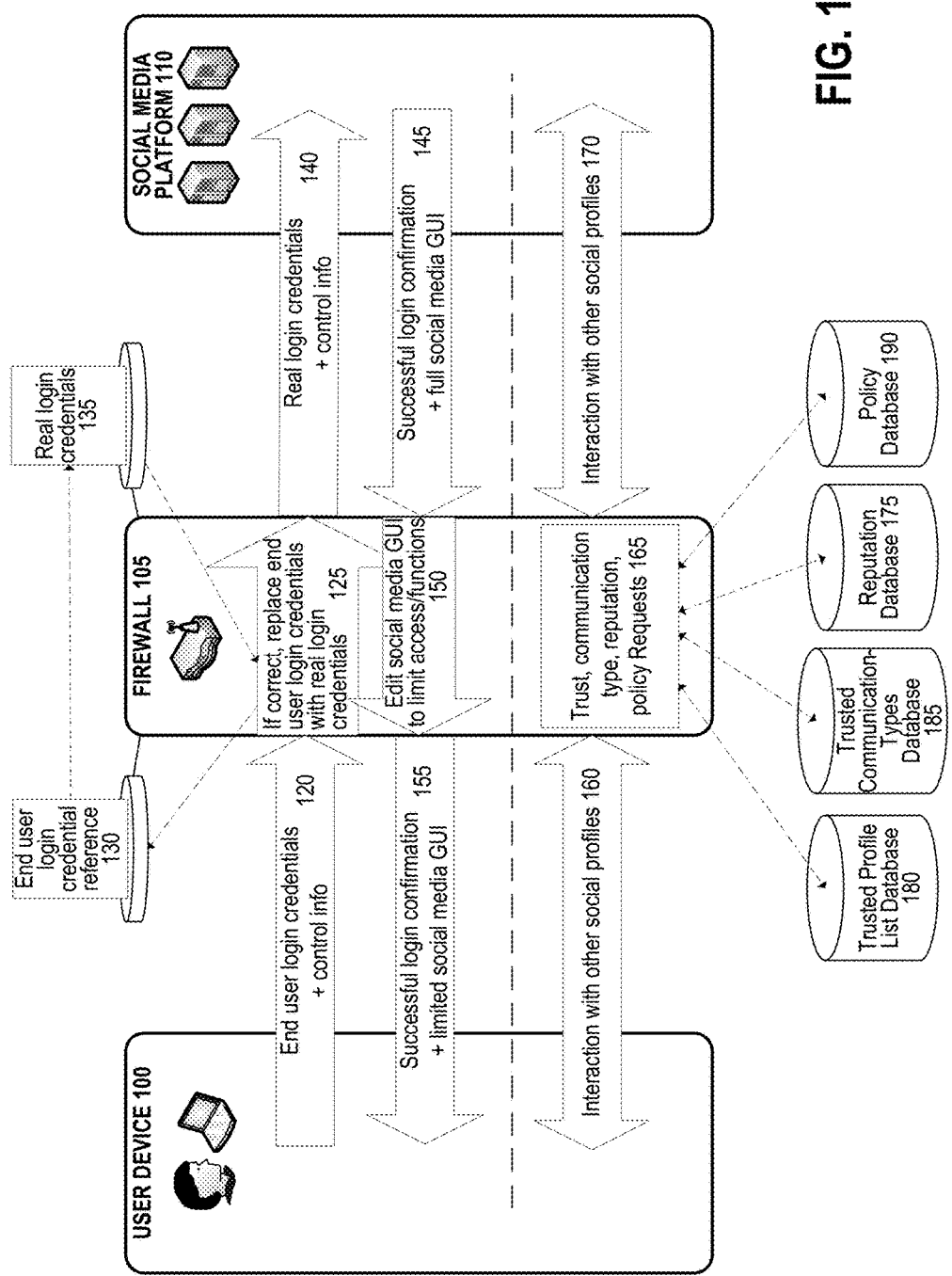
FIG. 1 is a flow diagram illustrating exemplary social media login operations within an exemplary firewall ecosystem.

FIG. 1 is a flow diagram illustrating exemplary social media login operations within an exemplary firewall ecosystem.

The exemplary firewall ecosystem of FIG. 1 includes a user device 100, a firewall 105, and a social media platform 110.

The user device 100 may be any type of computer system 600, and may include, for example, a processor 610, a memory (including a memory 620, a mass storage system 630, a portable storage system 640, or some combination thereof), and/or display system 670. The user device 100 may be, for example, a laptop computer, a desktop computer, a smartphone, a tablet device, a portable or non-portable media player device, a portable or non-portable video game console, or an e-book reader device.

The firewall 105 may include hardware, software, or some combination thereof. For example, the firewall 105 may be located at a wired or wireless router of a private network, such as a local area network (LAN) or a wireless local area network (WLAN) associated with a business or an organization. The firewall 105 may alternately be entirely software-based and executed directly at the user device 105.

The social media platform 110 may be any type of network-based service where users of the social media platform 110 can make a profile that can then be used to communicate with other profiles on the social media platform 110. The social media platform 110 may be a public social media platform that is provided to users on the Internet, or may alternately be a private social media platform that is provided to users on a private intranet.

The social media platform 110 may be run via a single network-connected computer system 600 (e.g., a server). The social media platform 110 may alternately be run via multiple network-connected computer systems 600 (e.g., multiple servers), which may include computer systems 600 that are networked together and/or computer systems 600 that are distributed throughout the Internet.

A profile of the social media platform 110 may represent a single person, as in a personal user profile. A profile of the social media platform 110 may alternately represent a group of people, as in a profile for a business (e.g., a corporation or a partnership), a profile for a governmental entity (e.g., a national government, a local government, an executive administration, a legislative body, a judicial court), or a profile for an organization (e.g., a club, an association, a church, a team, a union). A profile of the social media platform 110 may alternately represent an object (e.g. a toy, a game, a food object, a drink object), a concept (e.g., freedom, science, mathematics), a fictional character, a fictional group, a fictional object, or a fictional concept.

The social media login operations illustrated in FIG. 1 begin with a user entering end user login credentials into the user device 100, and optionally other control information. The other control information may include data conveying certain login options, such as a checkbox flag for a "keep me signed in" feature, or a checkbox flag for a "mobile version of the website" feature.

At step 120, the user device 100 transmits those end user login credentials, and optionally the other control information, with the social media platform 110 set as the intended destination of the transmission.

At step 125, the transmission passes through the firewall 105 on its way away from the user device 100 and toward the social media platform. The firewall 105 detects this transmission (e.g., by detecting the intended destination of the transmission and determining that it is the social media platform 110, and/or more specifically the login user interface of the social media platform 110) and reads the end user login credentials from the transmission. The firewall 105 compares the end user login credentials from the transmission to an end user login credential reference 130, which is stored at a firewall memory that is accessible to the firewall 105. If the end user login credentials from the transmission match the end user login credential reference 130, then the firewall 105 edits the transmission to replace the end user login credentials with real login credentials 135 (i.e., a set of login credentials that the social media platform 110 will accept as valid), which are also stored at the firewall memory (or alternately stored at a separate firewall memory that is also accessible by the firewall 105).

The firewall memory containing the end user login credential reference 130 and/or the real login credentials 135 may be a memory (e.g., including a memory 620, a mass storage system 630, a portable storage system 640, or some combination thereof) located at a hardware device including the firewall 105, such as a memory within a network router. The firewall memory containing the end user login credential reference 130 and/or the real login credentials 135 may instead be a memory at the user device 100 (e.g., particularly if the firewall 105 includes firewall software executed at the user device 100) that the firewall 105 can access but the user ordinarily cannot (e.g., the end user login credential reference 130 and/or the real login credentials 135 may be encrypted or password-protected). The firewall memory containing the end user login credential reference 130 and/or the real login credentials 135 may instead be stored at a different computer system 600 (not pictured) that the firewall 105 has access to through either a private network (e.g., LAN or WLAN) or the Internet, where the end user login credential reference 130 and/or the real login credentials 135 may be stored encrypted or password-protected.

At step 140, the firewall 105 then transmits the edited transmission onward to the social media platform 110, the edited transmission including the real login credentials 135 and, optionally, any control information that the original transmission from the user device 100 included.

At step 145, the social media platform 110 receives the edited transmission, confirms that the real login credentials 135 were correct login credentials associated with the profile that the user device 100 is trying to access, and sends back a social media graphical user interface (GUI) to the user device 100 as confirmation that the login was successful. The social media GUI is typically a launching portal for one or more communication functions between the logged in social media profile and other social media profiles that the logged-in social media profile is "linked" to (e.g., profiles belonging to "friends" or "contacts" or "connections" or "acquaintances" or "followers"), communication functions between the logged in social media profile and public users of the social media platform 110, and "linking" functions for linking the logged in social media profile to other social media profiles that the logged in social media profile is still not "linked" to.

At step 150, the firewall 105 receives the transmission of step 145 that includes the social media GUI from the social media platform 110 before it reaches the user device 100. The firewall 105 detects this transmission (e.g., by detecting the source of the transmission as the social media platform 110 and by detecting the intended destination of the transmission as the user device 100). The firewall 105 may then edit the transmission to modify the social media GUI within the transmission before sending the transmission on to the user device 100. For example, the social media GUI may be edited by the firewall 105 to remove any links that lead to a "change your password" or "forgot my password" page, or any GUI elements that otherwise allow the user to change or view the real login credentials 135 using user device 100 in communication with the social media platform 110. The firewall 105 may also edit the social media GUI to limit the ability of the user device 100 to "link" the logged-in social media profile to certain other social media profiles, or to limit the ability of the user device 100 to send or receive certain types of communications using certain communication functions (e.g., transfer of public messages, transfer of private messages, transfer of instant chat messages, transfer of files, real-time audio call conversations, real-time video call conversations, asynchronous audio messages, or asynchronous video messages, or ephemeral messages). Such limitations are further described with respect to FIG. 2.

At step 155, the edited version of the transmission of step 145, containing the social media GUI as edited in step 150 (e.g. which may have its functionality curtailed or limited as described with regard to step 150), is then sent onward from the firewall 105 to the user device 105.

Once the user device 100 is logged in and has received the edited social media GUI at step 155, the user device 100 can use the social media GUI, and other GUIs presented by the social media platform 110 (and optionally edited by the firewall 105), to interact with other social media profiles at step 160. Some of these interactions may be stopped or edited at the firewall 105 at step 165 as described further with respect to FIG. 2. Some of these interactions may, in step 170, be allowed past the firewall 105 on to the social media platform 110, and may trigger response transmissions from the social media platform 110, which may then be blocked at the firewall 105 or, at step 160, allowed (in some cases after being edited at the firewall 105 via requests at step 165) to reach the user device 100.

While the transmission passes through the firewall 105 at step 165, the firewall 105 may check one or more databases or other data structures to determine if various actions or GUI elements should be allowed through or be edited out. For example, a trusted profile list database 180 may be maintained at the firewall memory described before or at a different memory accessible to the firewall, and may identify other social media profiles that the logged-in social media profile is or isn't allowed to "link" to, for example via a whitelist (e.g. see FIG. 4A or FIG. 4B) or a blacklist (e.g., see FIG. 4C). A set of databases (e.g. trusted profile list database 180, reputation database 175, policy database 190) may be maintained to identify other social media profiles that the logged-in social media profile is or isn't allowed to "link" to (e.g., via whitelists, blacklists, reputation scores, or firewall policies) either as determined in real-time or as determined within a pre-defined time period. A trusted communication-types database 185 may also be maintained at the firewall memory described before or at a different memory accessible to the firewall, and may identify various types of communications using various communication functions that are allowed or are not allowed to be used to send or receive data via the logged-in social media profile (e.g. see FIG. 5A or FIG. 5B).

While the trusted profile list database 180, trusted communication-types database 185, reputation database 175, policy database 190 are illustrated in FIG. 1 as separate databases, in some cases, two or more of these may be combined into a single database or other data structure. These databases may all be stored in different memory systems, or two or more of these may be stored in the same memory system.

The operations illustrated in FIG. 1 can also be used for other network services that use user accounts or user profiles besides a social media platform, such as to an e-commerce account/profile (e.g., to control employee's access to a business' purchasing capabilities), a cloud storage account/profile (e.g., to control employee's access to a business' cloud-stored data), or to an e-mail account/profile (e.g., to control employee's ability to send and receive e-mail using a business' official e-mail account).

Figure 2:
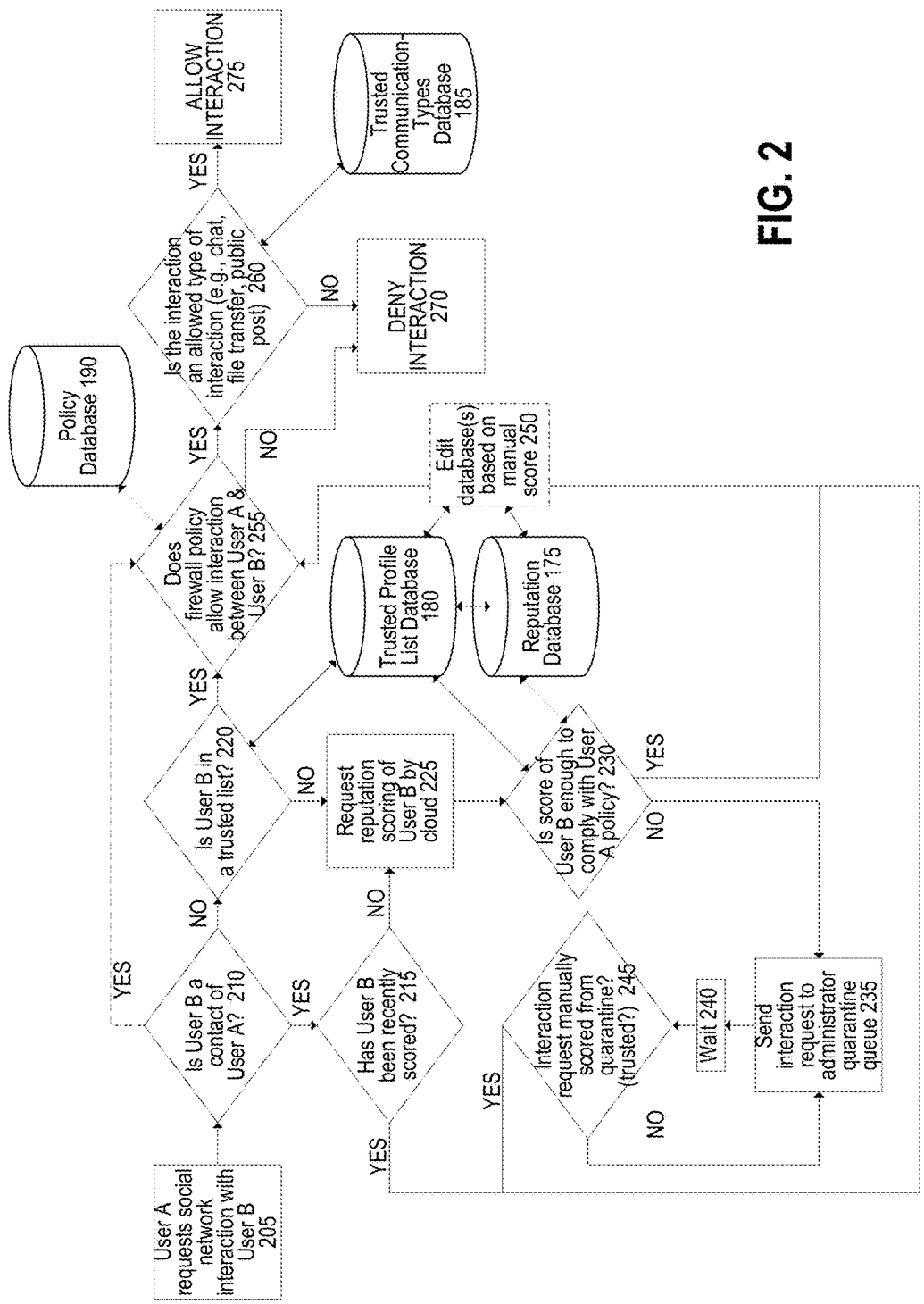
FIG. 2 is a flow chart illustrating exemplary social media profile communication operations within an exemplary firewall ecosystem.

FIG. 2 is a flow chart illustrating exemplary social media profile communication operations within an exemplary firewall ecosystem.

The social media profile communication operations of FIG. 2 begin at step 205, where a User A (e.g., User Device 100 of FIG. 1 logged in to a social media profile) requests a social network interaction (e.g., a "link," such as becoming a "friend" or a "contact" or a "connection" or an "acquaintance" or a "follower") with a User B (e.g., a second social media profile). The requested interaction of step 205 can also be a communication between the two profiles (e.g., if the profile of User A is already "linked" to the profile of User B), such as a message, a chat, a file transfer, an audio or video call, or some other type of communication.

In step 210, the firewall 105 receives the request of step 205 (e.g., see step 160 of FIG. 1). The firewall 105 determines that the User A is attempting to interact with the User B, and checks to see whether User B is already a contact of User A (e.g., whether User A is "linked" to User B, or whether the two profiles are "friends" or "connections" or "acquaintances" or "followers" of one another.

If the firewall 105 determines that the User B profile is already a contact of the User A profile at step 210, then the social media profile communication operations of FIG. 2 can skip forward to step 255 if no reputation-tracking is used. If reputation-tracking is enabled, a if the firewall 105 determines that the User B profile is already a contact of the User A profile at step 210, then at step 215, the firewall 105 determines whether or not the User B profile has been scored recently (e.g., a reputation score associated with the User B profile has been generated within a predetermined period of time, such as a number of hours or days or weeks or months), for example by checking the reputation/policy database 175. If the firewall 105 determines User B profile has been scored recently at step 215, then the social media profile communication operations of FIG. 2 can skip forward to step 255.

If the firewall 105 determines at step 215 that the User B profile has not been recently scored (e.g., the most recent reputation score associated with the User B profile in the reputation/policy database 175 was generated some time ago stretching farther back than a predetermined period of time), then the firewall 105 can, at step 225, request a reputation scoring of the User B profile. The reputation scoring may be performed by a cloud system (e.g., one or more computer systems 600, which may include systems within a private network and/or systems distributed throughout the internet), which may then receive the request and return the reputation score value result. The reputation scoring may alternately be performed by the firewall 105 itself. The reputation scoring may generate a reputation score value (e.g. an integer value which may be compared with a minimum reputation score value and a maximum reputation score value).

The reputation scoring may be, for example, based on activities by the User B profile (e.g., public online communications and activities using the social media platform 110, private communications between the User A profile and the User B profile using the social media platform 110). The reputation scoring may also (or alternately) be based on activities performed by a person or group that owns, uses, or is otherwise associated with the User B profile (e.g., a credit rating of the owner of the User B profile, a criminal record of the owner of the User B profile, an employment status of the owner of the User B profile, public political affiliations of the owner of the User B profile, public articles written by the owner of the User B profile).

At step 230, the firewall 105 then receives the reputation score value for the User B profile. The firewall 105 can then check the received reputation score value against a predetermined "minimum" reputation score value set according to the firewall policy for the User A profile, which may, for example, be stored at the trusted profile list database 180 or the reputation/policy database 175. In some cases, different minimum reputation score values may be present for different categories of profiles (e.g., categories for verified employees or organization members may need to pass a less stringent minimum reputation score value than other unknown profiles). If the reputation score value received at step 230 is higher than (or in some cases equal to) the relevant minimum reputation score value from a policy of the firewall 105, the social media profile communication operations can skip to step 255.

If the reputation score value received at step 230 is lower than (or in some cases equal to) the relevant minimum reputation score value from a policy of the firewall 105, the social media profile communication operations can either deny the interaction (e.g., step 270) or, at step 235, send the interaction request to an administrator quarantine queue, where the interaction is either put on hold or temporarily denied. The User B profile can then remain in the administrator quarantine queue for a time, during which the user device (e.g. user device 100 of FIG. 1) that is logged in to the User A profile may be required to wait for a time during step 240. The waiting of step 240 may allow other requests associated with the User A profile to be performed during the waiting period, or in some cases may put other User A profile requests on hold as well. The waiting period of step 240 may be resolved once the User B profile and/or the interaction request from step 205 gets manually scored at step 245 by an administrator user input (e.g., using an administrative system that includes one or more computer systems 600 with one or more user interfaces) or an artificially intelligent administrator algorithm input (e.g., using an administrative system that includes one or more computer systems 600 involved in executing an artificial intelligence and/or machine learning algorithm).

Once the User B profile has been manually scored by an administrator user input or an administrator algorithm input at step 245, this manual score may optionally be inserted, at step 250, into an entry of the trusted profile list database 180 (e.g. a whitelist or a blacklist depending on the manual scoring decision) and/or into an entry of the reputation database 175 (e.g., a lower or higher score depending on the manual scoring decision).

Referring back to step 210, if the firewall 105 determines that the User B profile is not a contact of the User A profile, then at step 220, the firewall may check if the User B profile is in a trusted list of the trusted profile list database 180. If the User B profile is not in a trusted list of the trusted profile list database 180, then the social media profile communication operations can start the previously described reputation score process at step 225 with regard to the User B profile. If the User B profile is in a trusted list of the trusted profile list database 180, then the social media profile communication operations go to step 255.

At step 255, the firewall 105 determines whether a firewall policy allows or prohibits the requested interaction between the User A profile and the User B profile. For this, the firewall 105 may access a policy database 190, which may share some entries with the trusted profile list database 180 or reputation database 175, or may also address unique policy-based concerns. For example, if the requested interaction between the User A profile and the User B profile is a file transfer, the policy database 190 may require that the file first successfully pass through an antivirus, anti-spyware, or anti-malware scan. Similarly, the policy database 190 may require that the interaction be performed securely via SSL or TLS, such as through an interface using the Hypertext Transfer Protocol Secure (HTTPS). Similarly, the policy database 190 may ensure that the interaction uses expected ports (e.g., File Transfer Protocol port 20 or 21, Secure Shell port 22, Telnet port 23, Simple Mail Transfer Protocol port 25, Hypertext transfer protocol 80, Post Office protocol 110, Internet Relay Chat port 194, HTTPS port 443, Simple Mail Transfer Protocol Secure port 465) and/or expected protocols (e.g., Request For Comment or "RFC" compliant protocols or common variants). Similarly, the policy database 190 may require that the interaction's communications come from an expected source (e.g., a server supporting the social media platform 110, or a computer associated with User B) and not some other source (e.g., a phishing scam). If, in step 255, the firewall policy does not allow the interaction between the User A profile and the User B profile for any of these reasons (e.g. detected) or other traditional firewall, the interaction may be denied in step 270.

In some cases, the policy database 190 may store different firewall policies depending on the social media profile or group of social media profiles interacted with (e.g. depending on information about the User B profile in FIG. 2). For example, a social media profile associated with a business may be allowed to receive file transfers without an antivirus scan from a social media profile associated with an employee, but may require an antivirus scan when receiving a file transfer from a social media profile associated with a member of the general public who is not an employee.

If, in step 255, the firewall policy allows the interaction between the User A profile and the User B profile, then in step 260, the communication type of the interaction (e.g. messages, chat, file transfer, video chat) is identified and checked against the trusted communication-types database 185, which identifies which of a set of communication types (e.g. transfer of public messages, transfer of private messages, transfer of instant chat messages, transfer of files, real-time audio call conversations, real-time video call conversations, asynchronous audio messages, or asynchronous video messages, or ephemeral messages) are to be allowed for use by the User A profile and which are to be prohibited for use by the User A profile. If the identified communication-type of the interaction is allowed in step 260 (e.g., as identified in the trusted communication-types database 185), then the interaction is allowed in step 275. If the identified communication-type of the interaction is prohibited in step 260 (e.g., as identified in the trusted communication-types database 185), then the interaction is denied in step 270.

Figure 3:
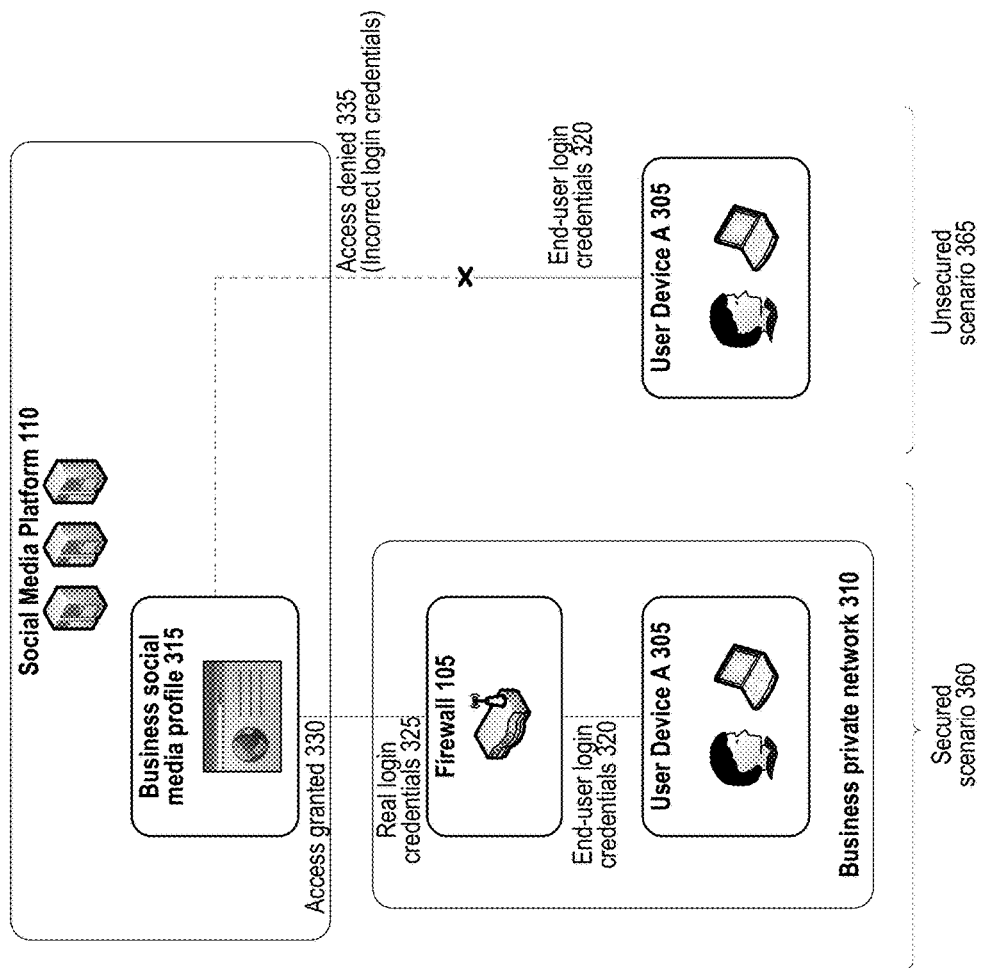
FIG. 3 illustrates social media login operations in a social media ecosystem.

FIG. 3 illustrates social media login operations in a social media ecosystem.

The social media ecosystem of FIG. 3 illustrates a user device A 305 attempting to log in to a business social media profile 315 hosted at a social media platform 110 in a secured scenario 360 and in an unsecured scenario 365.

In the secured scenario 360, the user device A 305 is inside a business private network 310, which includes a router with a firewall 105 that the user device A 305 communicates through in order to communicate with the social media platform 110. As depicted in FIG. 1, the user inputs a set of end-user login credentials 320 into the user device A, after which the input end-user login credentials 320 are sent to the firewall 105, and if they are the correct end-user login credentials 320, they are replaced with the real login credentials 325 by the firewall 105. The firewall 105 then sends the real login credentials 325 to the social media platform 110, after which access to the business social media profile 315 is granted 330 to the user device A 305 by the social media platform 110. The password switch is entirely transparent to the user device 305 and its user—as far as the user knows, the end-user login credentials 320 are the real credentials 325.

In the unsecured scenario 365, the user device A 305 is outside of the business private network 310. Therefore, any communications between the user device A 305 and the social media platform 110 do not pass through the firewall 105. Thus, in the unsecured scenario 365, the user inputs a set of end-user login credentials 320 into the user device A, after which the input end-user login credentials 320 are sent unaltered to the social media platform 110. Because the social media platform 110 will not recognize that the end-user login credentials 320, as it will be waiting to accept the real login credentials 325. Thus, access to the business social media profile 315 is denied 335 to the user device A 305 by the social media platform 110.

One benefit of the scenarios illustrated in FIG. 3 includes protection from malicious interference with the business social media profile 315 by an employee who was laid off. Another benefit of the scenarios illustrated in FIG. 3 includes insurance that any communications or interactions using the business social media profile 315 can be supervised or reviewed in a work environment. Another benefit of the scenarios illustrated in FIG. 3 includes prevention of accidental communications or interactions using the business social media profile 315 outside of work (e.g. accidental "pocket posting" through issues related to touchscreens or other forms of input, or accidental "wrong profile" communications that were intended to be performed using a different social media profile such as an employee's personal social media profile). Another benefit of the scenarios illustrated in FIG. 3 includes platform independence (e.g., because the masquerading of the login credentials is performed at the firewall 105, the user device 305 can be any kind of device, from a laptop to a phone to a wearable device to an "internet of things" device, and needs no special pre-installation or preparation or maintenance).

While the firewall 105 of FIG. 3 is illustrated as a hardware-based firewall 105 housed at a router for a business private network, it should be understood that this is intended to be illustrative rather than restrictive, and that the firewall 105 may be a software firewall stored at the user device A 305, for example. In such cases the secured scenario 360 may occur any time the software firewall 105 is installed and active, and the unsecured scenario 365 may occur any time the software firewall 105 is uninstalled or inactive. In some cases, the software firewall 105 may still retain the distinct "in-office" secured scenario 360 and "out-of-office" unsecured scenario 365 by only activating the firewall 105, or at least the login-masquerading feature of the firewall 105, when the firewall 105 detects that the user device A 305 is connected to an appropriate network (e.g. the business private network 310) or detects that the user device A 305 is geographically located (e.g., detected using a global positioning system transceiver or an Internet Protocol address trace) in an appropriate area (e.g., an office building associated with the business corresponding to the business social media profile 315 and business private network 310).

Figure 4A:
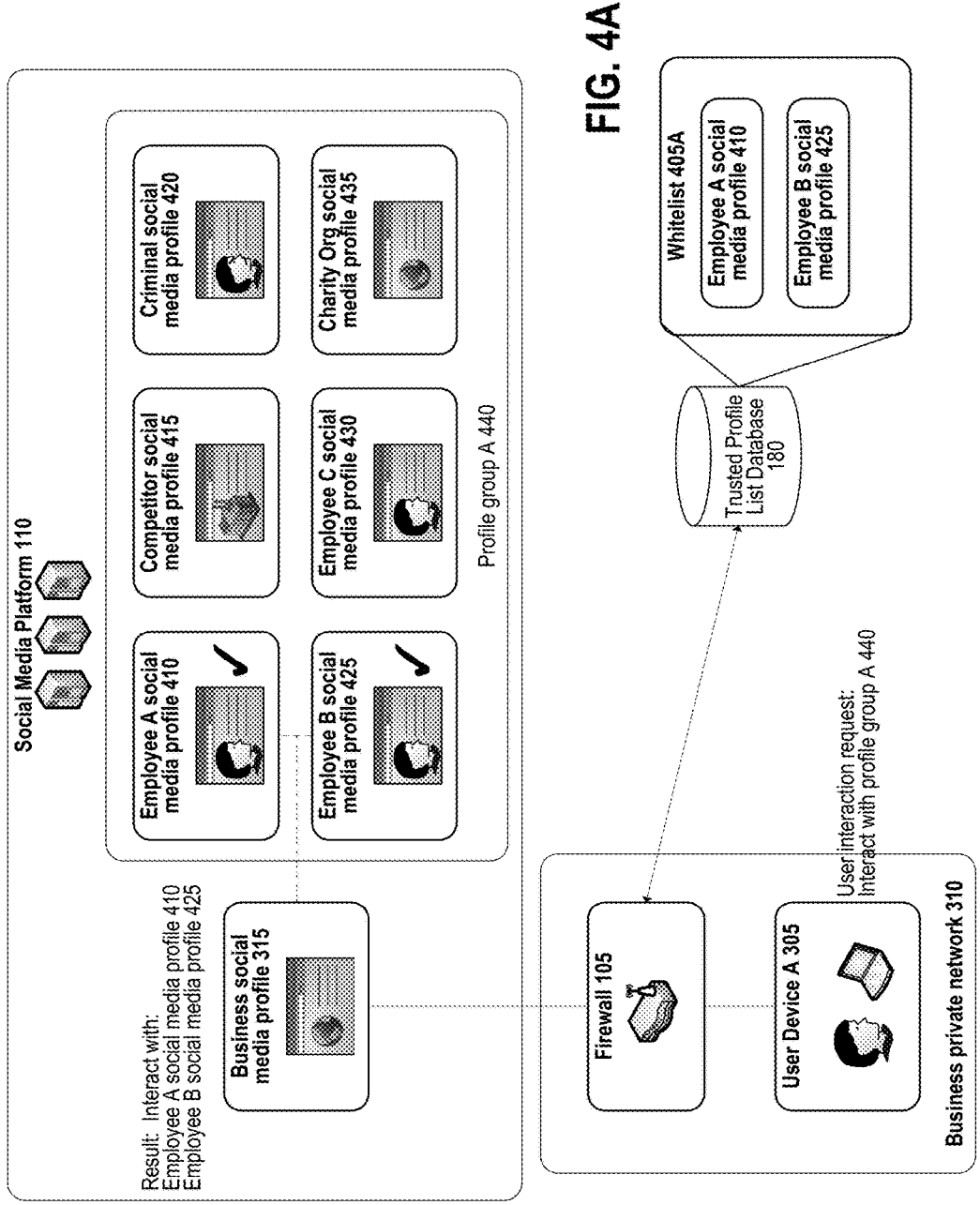
FIG. 4A illustrates social media interaction operations in a social media ecosystem using a whitelist.

FIG. 4A illustrates social media interaction operations in a social media ecosystem using a whitelist. In particular, the social media linking operations of FIG. 4A are represented by step 220 of the flow diagram of FIG. 2.

The social media ecosystem of FIG. 4A illustrates user device A 305 accessing the business social media profile 315 at the social media platform 110 from behind hardware firewall 105 within business private network 310. It should be understood that the business private network 310 is optional and that the firewall 105 may optionally be a software firewall 105 (e.g., installed onto and executed by the user device A 305), or that the firewall 105 may include some combination of hardware and software firewall elements.

The social media platform 110 includes, in addition to the business social media profile 315, at least a profile group A 440, which includes an Employee A social media profile 410, an Employee B social media profile 425, an Employee C social media profile 430, a Competitor social media profile 415, a Criminal social media profile 420, and a Charity Organization ("Org") social media profile 435.

The user device A 305 sends one or more user interaction requests (e.g., as in step 205 of FIG. 2) requesting that the business social media profile 315 interact with (e.g., link with, communicate with) all of the social media profiles of profile group A 440, either as a group or individually.

The firewall 105 then checks each social media profile in profile group A 440 against a trusted profile list database 180, which in the embodiment depicted in FIG. 4A includes a whitelist 405A, the whitelist 405A identifying that the employee A social media profile 410 and the employee B social media profile 425 are trusted profiles that the firewall 105 should allowed to interact with the business social media profile 315.

Assuming no further steps by the firewall 105 (e.g., reputation checks as in step 225, policy checks as in step 255, or communication-type checks as in step 260), the result is then that the business social media profile 315 is allowed to interact with the employee A social media profile 410 and the employee B social media profile 425.

This result is very safe (e.g. little danger of undesirable social media interactions), but allows for very little freedom of interaction from user device A 305, and can sometimes prohibit interactions that might be helpful (e.g., interactions with Employee C social media profile 430 or with Charity Organization social media profile 435).

Figure 4B:
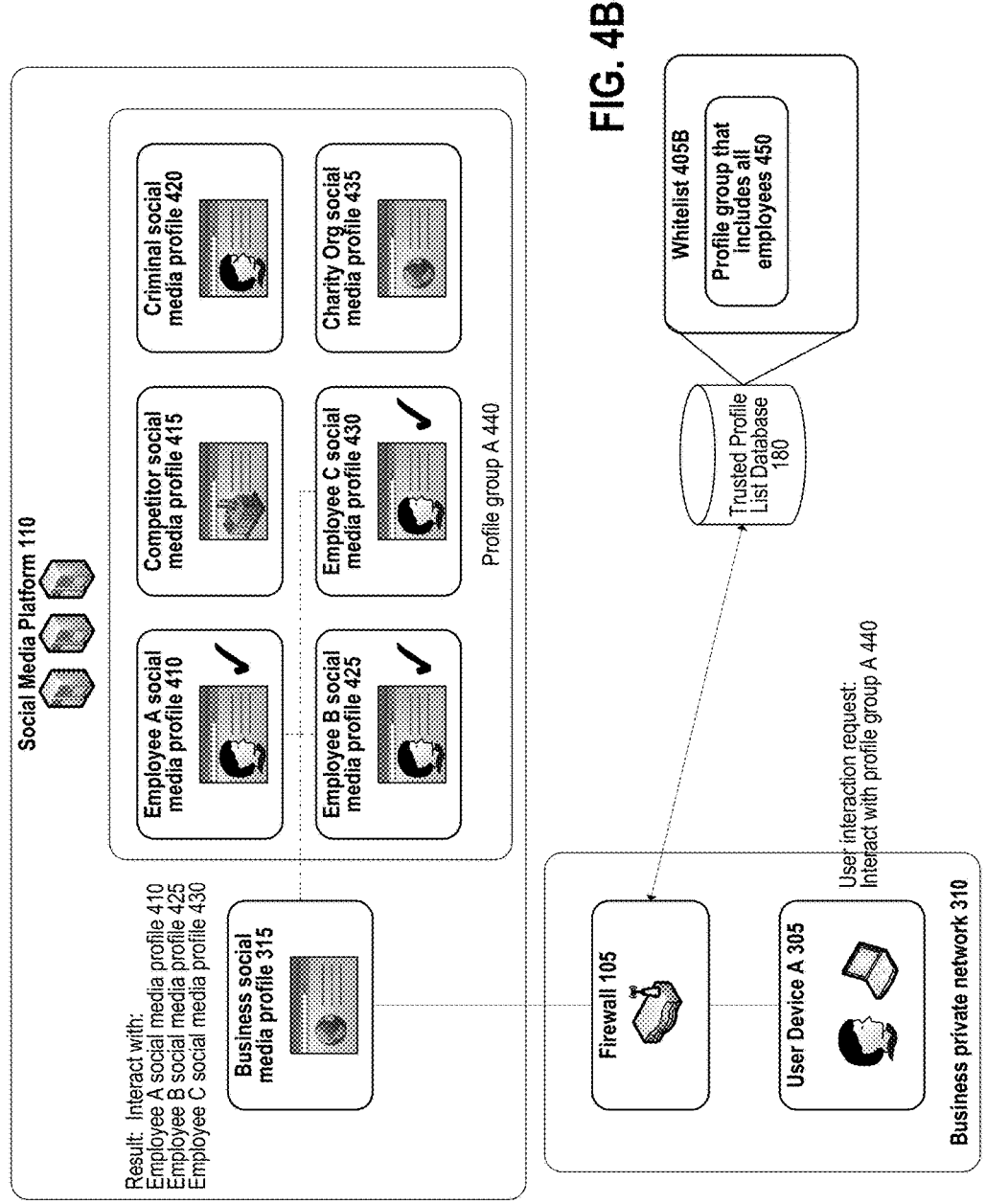
FIG. 4B illustrates social media interaction operations in a social media ecosystem using a set-based whitelist.

FIG. 4B illustrates social media interaction operations in a social media ecosystem using a set-based whitelist.

The social media ecosystem of FIG. 4B illustrates user device A 305 accessing the business social media profile 315 at the social media platform 110 from behind hardware or software firewall 105 and optionally within business private network 310 as in FIG. 4A. The social media platform 110 includes, in addition to the business social media profile 315, at least a profile group A 440 as described in relation to FIG. 4A.

The user device A 305 sends one or more user interaction requests (e.g., as in step 205 of FIG. 2) requesting that the business social media profile 315 interact with (e.g., link with, communicate with) all of the social media profiles of profile group A 440, either as a group or individually.

The firewall 105 then checks each social media profile in profile group A 440 against a trusted profile list database 180, which in the embodiment depicted in FIG. 4B includes a whitelist 405B, the whitelist 405B identifying a profile group that includes all employees 450 (e.g. which be kept up-to-date manually with the assistance of an administrator, kept up-to-date automatically by checking a separate employment database, data structure, or other employment data system, or determined in real-time by checking each social media profile in the profile group A 440 for information indicating that the social media profile belongs to an employee). The profile group that includes all employees 450 should include, out of profile group A 440, the employee A social media profile 410, the employee B social media profile 425, and the employee C social media profile 430.

Assuming no further steps by the firewall 105 (e.g., reputation checks as in step 225, policy checks as in step 255, or communication-type checks as in step 260), the result is then that the business social media profile 315 is allowed to interact with the employee A social media profile 410, the employee B social media profile 425, and the employee C social media profile 430.

This result is still quite safe (e.g. little danger of undesirable social media interactions), but allows for little freedom of interaction from user device A 305, and can sometimes prohibit interactions that might be helpful (e.g., interactions with Charity Organization social media profile 435).

Figure 4C:
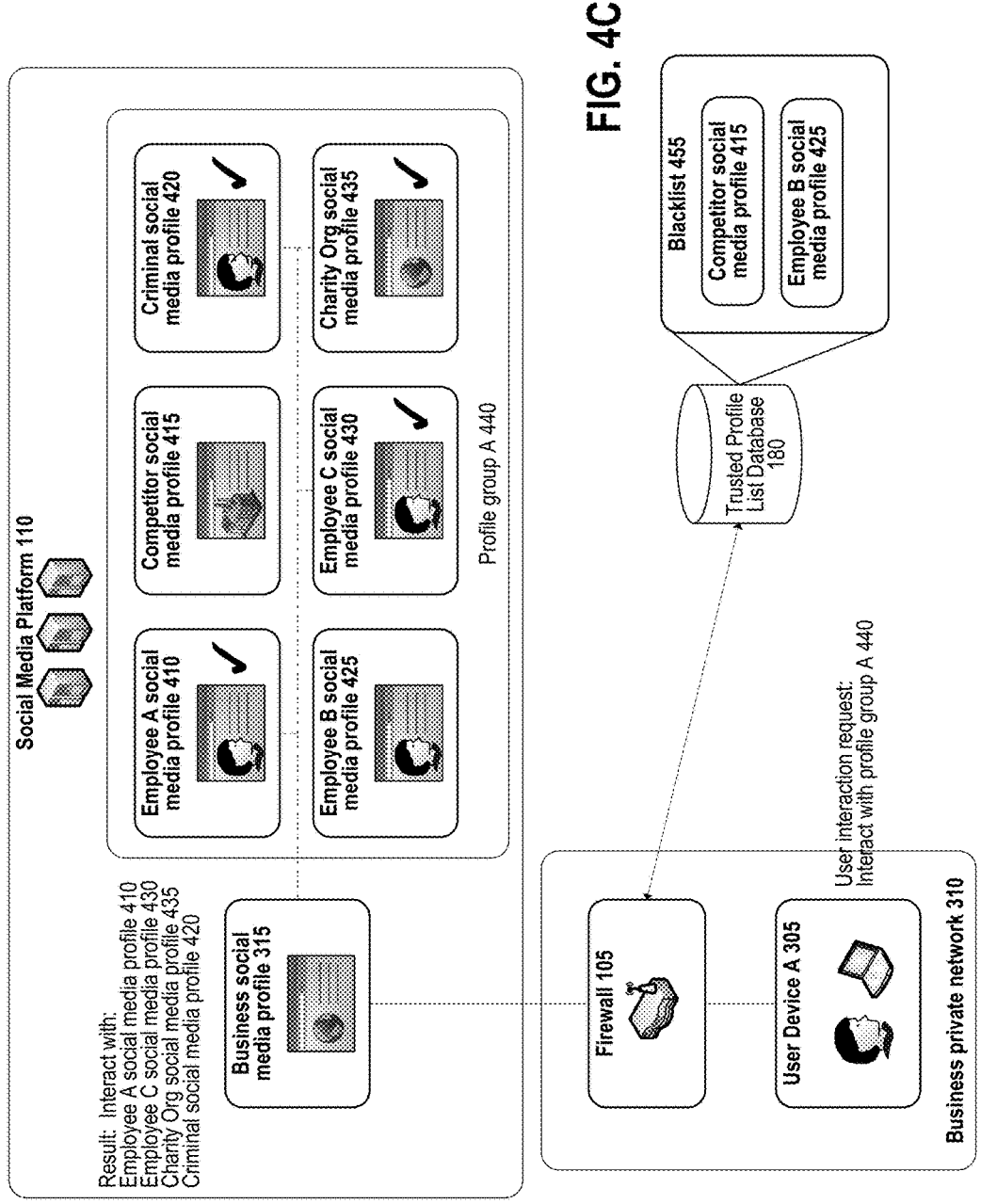
FIG. 4C illustrates social media interaction operations in a social media ecosystem using a blacklist.

FIG. 4C illustrates social media interaction operations in a social media ecosystem using a blacklist.

The social media ecosystem of FIG. 4C illustrates user device A 305 accessing the business social media profile 315 at the social media platform 110 from behind hardware or software firewall 105 and optionally within business private network 310 as in FIG. 4A. The social media platform 110 includes, in addition to the business social media profile 315, at least a profile group A 440 as described in relation to FIG. 4A.

The user device A 305 sends one or more user interaction requests (e.g., as in step 205 of FIG. 2) requesting that the business social media profile 315 interact with (e.g., link with, communicate with) all of the social media profiles of profile group A 440, either as a group or individually.

The firewall 105 then checks each social media profile in profile group A 440 against a trusted profile list database 180, which in the embodiment depicted in FIG. 4B includes a blacklist 455, the blacklist 455 identifying that the competitor social media profile 415 and the employee B social media profile 425 (e.g., perhaps an employee who is known to speak controversially using the social media platform 110) are untrusted social media profiles that the firewall 105 should prohibit from interacting with the business social media profile 315. In other embodiments, a blacklist 455 can identify groups of untrusted profiles, similarly to the whitelist 405B of FIG. 4B.

Assuming no further steps by the firewall 105 (e.g., reputation checks as in step 225, policy checks as in step 255, or communication-type checks as in step 260), the result is then that the business social media profile 315 is allowed to interact with the employee A social media profile 410, the employee C social media profile 430, the Charity Organization social media profile 435, and the Criminal social media profile 420.

This result is more risky than use of a whitelist (e.g. more danger of undesirable social media interactions), but allows for more freedom of interaction from user device A 305. Use of a blacklist can sometimes result in interactions that might be undesirable, since it is difficult to identify any and all social profiles that might produce undesirable interactions going forward into the future (e.g., interactions are still allowed between the business social media profile 315 and the Criminal social media profile 420).

Figure 4D:
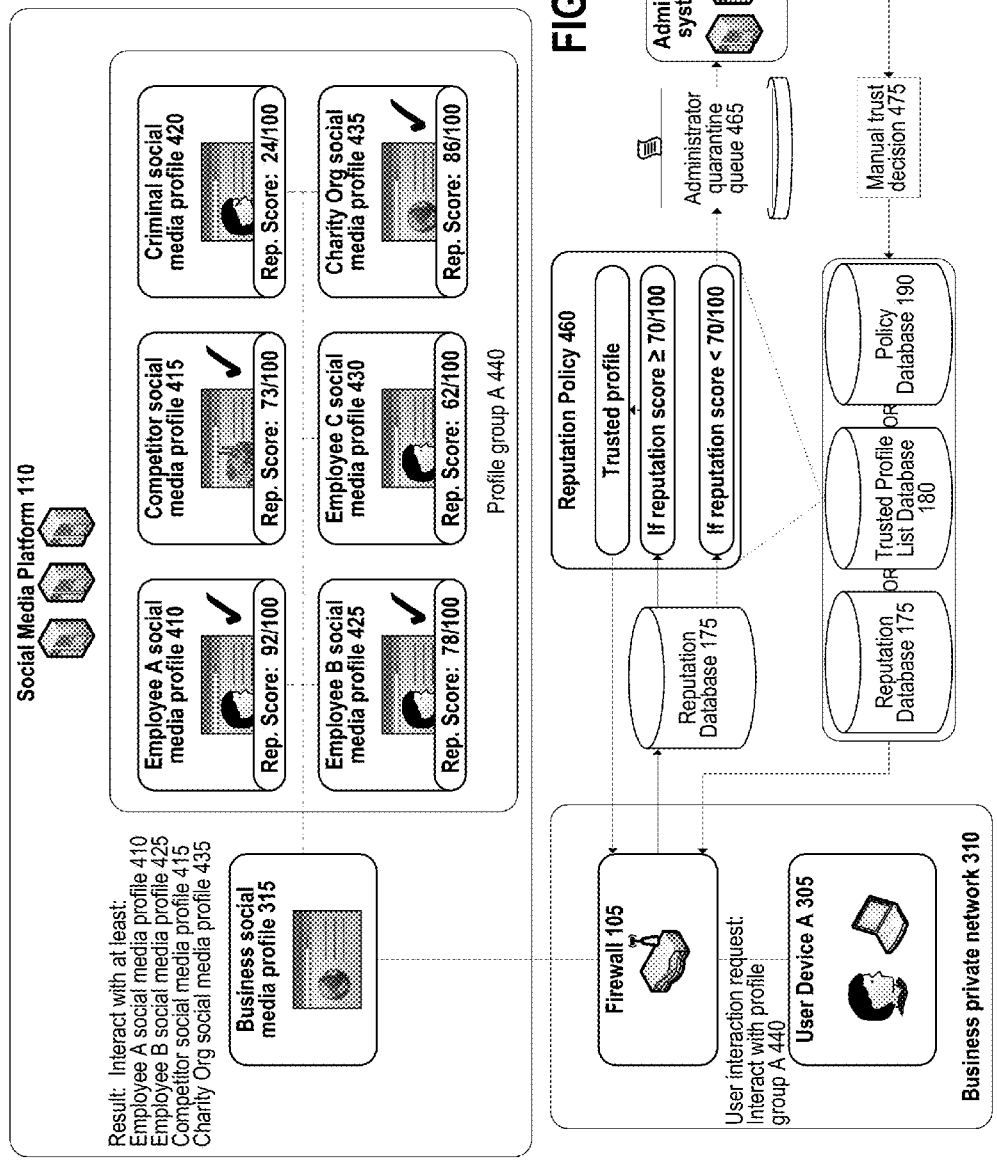
FIG. 4D illustrates social media interaction operations in a social media ecosystem using a reputation scoring system.

FIG. 4D illustrates social media interaction operations in a social media ecosystem using a reputation scoring system.

The social media ecosystem of FIG. 4D illustrates user device A 305 accessing the business social media profile 315 at the social media platform 110 from behind hardware or software firewall 105 and optionally within business private network 310 as in FIG. 4A. The social media platform 110 includes, in addition to the business social media profile 315, at least a profile group A 440 as described in relation to FIG. 4A.

The user device A 305 sends one or more user interaction requests (e.g., as in step 205 of FIG. 2) requesting that the business social media profile 315 interact with (e.g., link with, communicate with) all of the social media profiles of profile group A 440, either as a group or individually.

The firewall 105 then obtains a reputation score value for each social media profile in profile group A 440, either by obtaining an existing reputation score value stored in the reputation database 175, or by determining it in real-time using a reputation software or hardware or some combination thereof (not shown), which may be provided by the firewall 105 itself or a third party. Once the reputation score value for each social media profile in profile group A 440 has been obtained, it may be checked against a predetermined reputation score limit (e.g., 70 out of 100 as depicted in FIG. 4D). If the reputation score value associated with a particular social media profile in profile group A 440 is greater than or equal to 70, a reputation policy 460 (e.g., provided by the trusted profile list database 180, the policy database 190, the reputation database 175, or some combination thereof) indicates that particular social media profile should be treated as a trusted social media profile. If the reputation score value associated with a particular social media profile in profile group A 440 is less than 70, the reputation policy 460, the interaction request associated with that particular social media profile is placed into an administrator quarantine queue 465 (e.g. see step 235 of FIG. 2).

For example, in FIG. 4D, the Employee A social media profile 410 is identified as having a reputation score of 92 out of 100, which means that it is a trusted social media profile according to the reputation policy 460. The Employee B social media profile 425 is identified as having a reputation score of 78 out of 100, which means that it is a trusted social media profile according to the reputation policy 460. The Competitor social media profile 415 is identified as having a reputation score of 73 out of 100, which means that it is a trusted social media profile according to the reputation policy 460. The Charity Organization social media profile 435 is identified as having a reputation score of 86 out of 100, which means that it is a trusted social media profile according to the reputation policy 460.

The Employee C social media profile 430 is identified as having a reputation score of 62 out of 100, which means that it is not a trusted social media profile according to the reputation policy 460, and the interaction request associated with the Employee C social media profile 430 will wait in the administrator quarantine queue 465 for manual scoring, approval, or denial. The Criminal social media profile 420 is identified as having a reputation score of 24 out of 100, which means that it is not a trusted social media profile according to the reputation policy 460, and the interaction request associated with the Criminal social media profile 420 will wait in the administrator quarantine queue 465 for manual scoring, approval, or denial.

The administrator quarantine queue 465 may then, optionally after a waiting period 240, be accessed by an administrator system 470 (e.g., which may include one more computer systems 600 and may receive administrator user inputs or computer algorithm inputs or some combination thereof as described in relation to step 245 of FIG. 2). The administrator system 470 may produce a manual trust decision 475, either affecting only the particular interaction requested or affecting the reputation of the social media profile (e.g., the reputation score value may increase or decrease as a result of the manual trust decision 475) or affecting the trust list status of the social media profile (e.g. the social media profile may be placed on a whitelist or a blacklist) or affecting the policy requirements of the social media profile (e.g. require successful antivirus and anti-malware scan for all interactions with the social media profile), or some combination thereof. When relevant, edits may be made to the profile list database 180 and/or the policy database 190 and/or reputation database 175 based on the manual trust decision 475.

Assuming no further steps by the firewall 105 (e.g., trusted profile list checks as in step 220 or FIG. 4A or FIG. 4B or FIG. 4C, policy checks as in step 255, or communication-type checks as in step 260), the result is then that the business social media profile 315 is allowed to interact at least with the employee A social media profile 410, the employee B social media profile 425, the Competitor social media profile 415, and the Charity Organization social media profile 435.

This result is a balance between the benefits and risks of a whitelist and a blacklist, and often can produce good interaction safety but may sometimes result in a delay while an interaction waits in quarantine. Some risk may also be present, as some social media profiles may have a good reputation but still be undesirable to interact with for other reasons, such as financial conflict of interest (e.g., the Competitor social media profile 415).

Figure 5A:
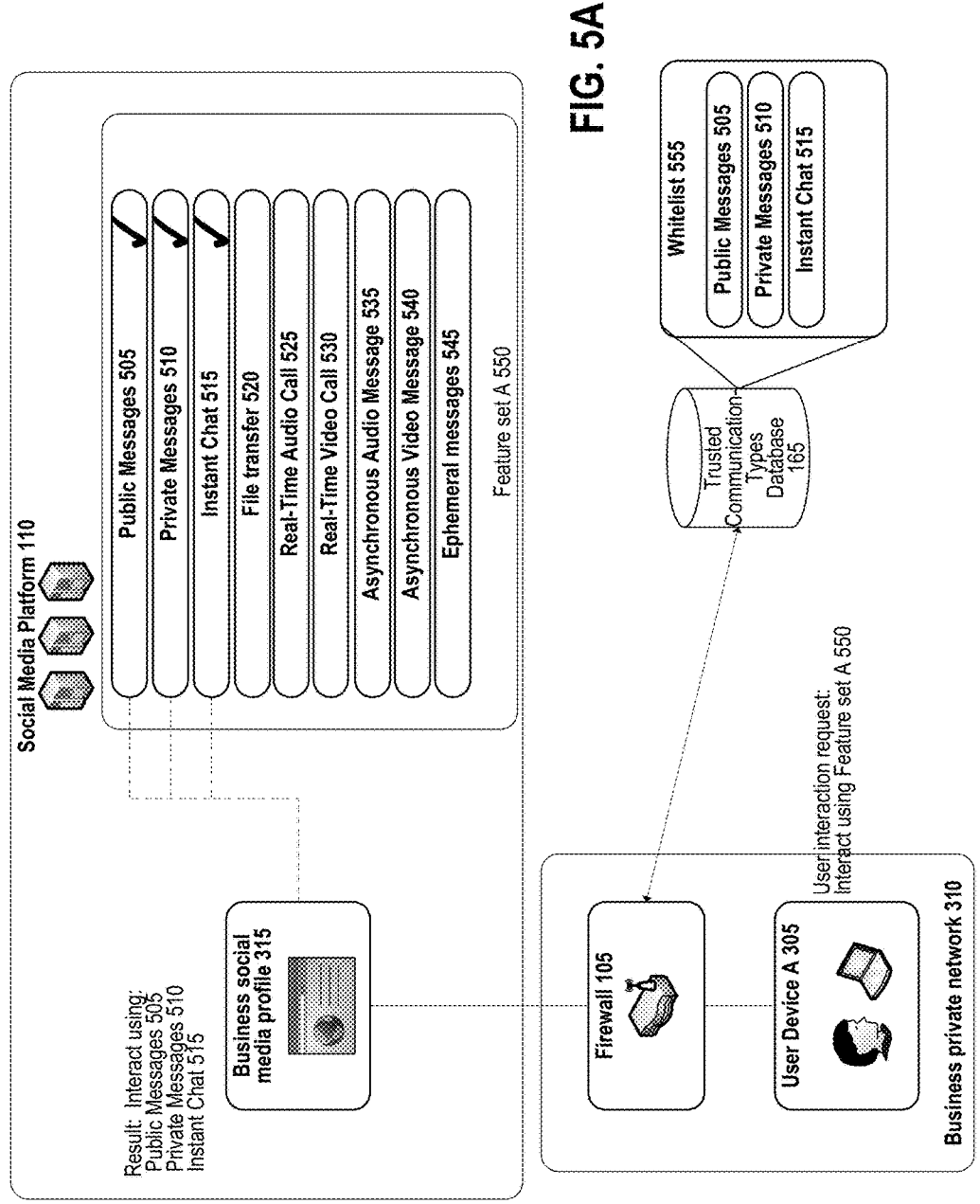
FIG. 5A illustrates social media communication operations in a social media ecosystem using a whitelist.

FIG. 5A illustrates social media communication operations in a social media ecosystem using a whitelist.

The social media ecosystem of FIG. 5A illustrates user device A 305 accessing the business social media profile 315 at the social media platform 110 from behind hardware or software firewall 105 and optionally within business private network 310 as in FIG. 4A.

The social media platform 110 includes at least a feature set A 550, which identifies various communication types that the business social media profile 315 can perform in a given interaction with another social media profile using the social media platform 110, including public messages 505 (e.g. including text and/or images), private messages 510 (e.g. including text and/or images), instant chat 515 (e.g. including text and/or images), file transfer 520, real-time audio call 525, real-time video call 530, asynchronous audio messages 535, asynchronous video messages 540, or ephemeral messages 545 (e.g. including text and/or images that expire or are deleted after a period of time and/or after being viewed).

The user device A 305 sends one or more user interaction requests (e.g., as in step 205 of FIG. 2) requesting that the business social media profile 315 interact with (e.g., communicate with) one or more other social media profiles using each communication type of the feature set A 550.

The user interaction request(s) sent by the user device A 305 is then intercepted by the firewall 105 en route to the social media platform 110. The firewall 105 can then check the feature set A 550 identified in the user interaction request(s) against a trusted communication-types database 165. In FIG. 5A, the trusted communication-types database 165 includes a whitelist 555 that identifies public messages 505, private messages 510, and instant chat 515 as trusted forms of the communication that the business social media profile 315 should be allowed to use to interact with other social media profiles.

Assuming no further steps by the firewall 105 (e.g., trusted profile list checks as in step 220 or FIG. 4A or FIG. 4B or FIG. 4C, policy checks as in step 255, or reputation checks as in step 225 or FIG. 4D), the result is then that the business social media profile 315 is allowed to interact with other social media profiles using public messages 505, private messages 510, and instant chat 515.

FIG. 5B illustrates social media communication operations in a social media ecosystem using a blacklist.

The social media ecosystem of FIG. 5B illustrates user device A 305 accessing the business social media profile 315 at the social media platform 110 from behind hardware or software firewall 105 and optionally within business private network 310 as in FIG. 4A. The social media platform 110 includes a variety of communication types that can be used by social media profiles to interact with each other, the communication types including at least those identified in feature set A 550.

The user device A 305 sends one or more user interaction requests (e.g., as in step 205 of FIG. 2) requesting that the business social media profile 315 interact with (e.g., communicate with) one or more other social media profiles using each communication type of the feature set A 550.

The user interaction request(s) sent by the user device A 305 is then intercepted by the firewall 105 en route to the social media platform 110. The firewall 105 can then check the feature set A 550 identified in the user interaction request(s) against a trusted communication-types database 165. In FIG. 5B, the trusted communication-types database 165 includes a blacklist 560 that identifies file transfer 520, real-time audio call 525, real-time video call 530, and asynchronous video messages 540 as untrusted forms of the communication that the business social media profile 315 should not be allowed to use to interact with other social media profiles.

Assuming no further steps by the firewall 105 (e.g., trusted profile list checks as in step 220 or FIG. 4A or FIG. 4B or FIG. 4C, policy checks as in step 255, or reputation checks as in step 225 or FIG. 4D), the result is then that the business social media profile 315 is allowed to interact with other social media profiles using public messages 505, private messages 510, instant chat 515, asynchronous audio messages 535, and ephemeral messages 545.

In some cases, the trusted communication-types database 165 may store a different whitelist 545 or a different blacklist 560 depending on the social media profile or group of social media profiles interacted with. For example, the business social media profile 315 may be allowed more freedom when interacting with social media profiles associated with employees than with social media profiles associated with consumers or competitors.

It should be understood that the business social media profile 315 in the foregoing detailed description and in the illustrations of FIG. 3, FIG. 4A, FIG. 4B, FIG. 4C, FIG. 4D, FIG. 5A, and FIG. 5B may instead be a social media profile 315 associated with an organization, an individual person (e.g., the user using the user device 305), a group of people, a concept, or a fictional entity, or any other type of social media profile described in FIG. 1. Similarly, it should be understood that the business private network 310 of FIG. 3, FIG. 4A, FIG. 4B, FIG. 4C, FIG. 4D, FIG. 5A, and FIG. 5B may be a private network associated with an organization or a group or a person (e.g., the user using the user device 305), rather than a business, or may be missing entirely, as might be the case if the firewall 105 is a software firewall 105 that is executed by a processor of the user device A 305.

Figure 6:
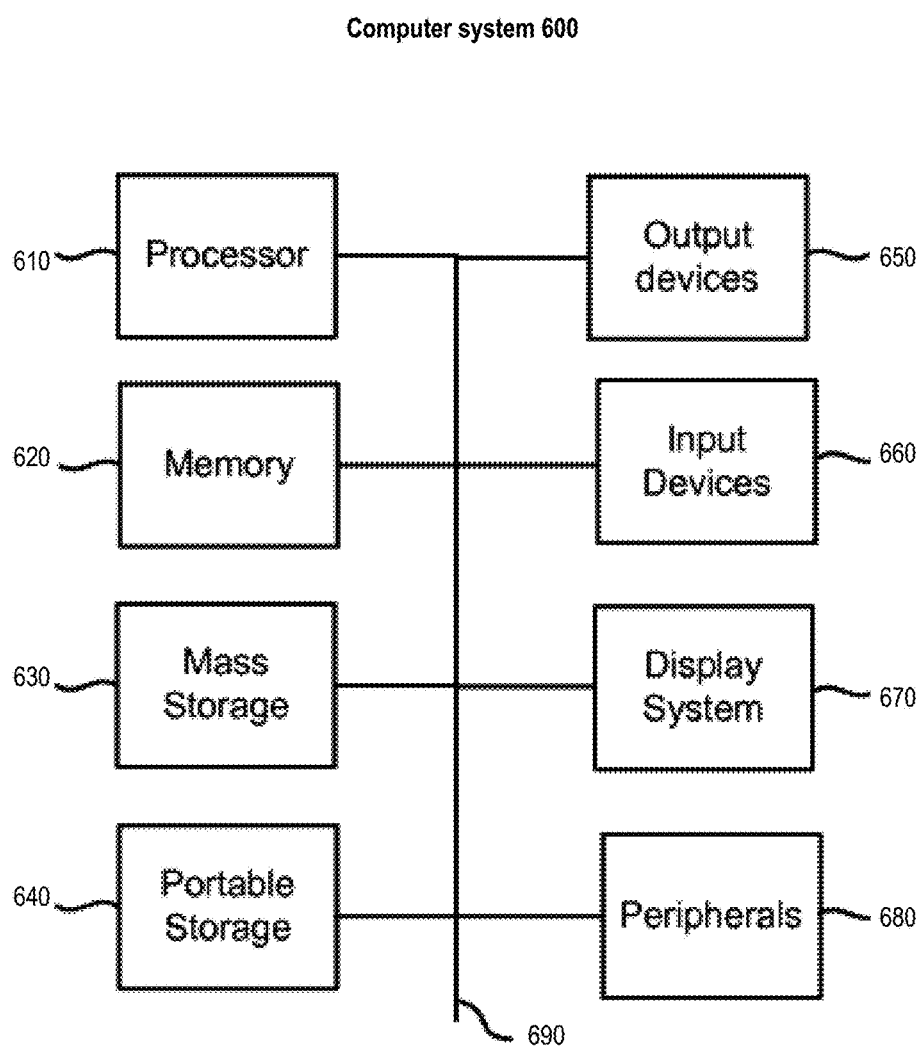
FIG. 6 is a block diagram of an exemplary computing device that may be used to implement an embodiment of the present invention.

FIG. 6 illustrates an exemplary computing system 600 that may be used to implement an embodiment of the present invention. The computing system 600 of FIG. 6 includes one or more processors 610 and memory 610. Main memory 610 stores, in part, instructions and data for execution by processor 610. Main memory 610 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 610 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 610.

Portable storage device 640 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD), a plasma display, an organic light-emitting diode (OLED) display, an electronic ink display, or another suitable display device. Display system 670 receives textual and graphical information, and processes the information for output to the display device. The display system 670 may include touchscreen input capabilities, such as capacitive touch detection.

Peripherals 680 may include any type of computer support device to add additional functionality to the computer system. For example, peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, nonvolatile and volatile media such as optical or magnetic disks and dynamic memory, respectively. Common forms of nontransitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A system for social media interaction management, the system comprising:
    a memory that stores firewall instructions;
    a communication interface that receives an interaction request destined for a social media platform server from a user device that is logged into a first social media profile of the social media platform server, the interaction request identifying at least a second social media profile and a communication type; and
    a processor coupled to the memory, wherein execution of the firewall instructions by the processor:
        accesses a group social media profile associated with a first group,
        identifies that the identified second social media profile is a trusted social media profile based on the first and the second social media profile being associated with the first group and based on information included in the group social media profile,
        identifies that the identified communication type is a trusted communication type based on the first and the second social media profile being associated with the first group and based on the information included in the group social media profile, and
        identifies that the interaction request is to be sent to the social media platform server based on the identification that the second social media profile is a trusted social media profile and the identification that the communication type is a trusted communication type.

2. The system of claim 1, further comprising a router associated with a private network, wherein the communication interface comprises a network interface of the router.

3. The system of claim 1, wherein the communication interface comprises a user interface of the user device.

4. The system of claim 1, wherein the communication interface further transmits the interaction request to the social media platform server based on the identification that the request is to be sent to the social media platform.

5. The system of claim 1, wherein the network interface receives another interaction request identifying a third social media profile and another communication type, and wherein the processor executes further instructions to block transmission of the another interaction request to the social media platform server based on identifying that the third social media profile is not a trusted social media profile or identifying that the another communication type is not a trusted communication type.

6. The system of claim 1, wherein the identified communication type is at least one of a public message transfer, a private message transfer, an instant chat message transfer, a file transfer, a real-time audio call, a real-time video call, an asynchronous audio message, an asynchronous video message, or an ephemeral message.

7. The system of claim 1, wherein the processor identifies that the communication type is a trusted communication type by comparing the communication type to one of a predefined communication type whitelist or a predefined communication type blacklist.

8. The system of claim 1, wherein the processor identifies that the second social media profile is a trusted social media profile by comparing the second social media profile to one of a predefined profile whitelist or a predefined profile blacklist.

9. The system of claim 1, wherein the processor identifies that the identified second social media profile is a trusted social media profile by comparing an identified reputation score value associated with the second social media profile with a predefined minimum reputation score limit value, the communication interface receives a second interaction request destined for the social media platform server, the second interaction request associated with a third social media profile that is associated with the group, and the second interaction request is not allowed based on a second reputation score associated with the third social media profile being below the reputation score limit.

10. A method for social media interaction management, the method comprising:
    receiving an interaction request destined for a social media platform server from a user device that is logged into a first social media profile of the social media platform server, the interaction request identifying at least a second social media profile and a communication type; and
    executing instructions stored in memory, wherein execution of the instructions by a processor:
        accesses a group social media profile associated with a first group,
        identifies that the identified second social media profile is a trusted social media profile based on the first and the second social media profile being associated with the first group and based on information included in the group social media profile,
        identifies that the identified communication type is a trusted communication type based on the first and the second social media profile being associated with the first group and based on the information included in the group social media profile, and
        identifies that the interaction request is to be sent to the social media platform server based on the identification that the second social media profile is a trusted social media profile and the identification that the communication type is a trusted communication type.

11. The method of claim 10, wherein the processor is part of a router associated with a private network.

12. The method of claim 10, further comprising transmitting the interaction request to the social media platform server based on the identification that the request is to be sent to the social media platform.

13. The method of claim 10, further comprising receiving another interaction request identifying a third social media profile and another communication type, and transmitting the another interaction request to the social media platform server based on identifying that the third social media profile is not a trusted social media profile or identifying that the another communication type is not a trusted communication type.

14. The method of claim 10, wherein the identified communication type is at least one of a public message transfer, a private message transfer, an instant chat message transfer, a file transfer, a real-time audio call, a real-time video call, an asynchronous audio message, an asynchronous video message, or an ephemeral message.

15. The method of claim 10, wherein the processor identifies that the communication type is a trusted communication type based on comparing the identified communication type to one of a predefined communication type whitelist or a predefined communication type blacklist.

16. The method of claim 10, wherein the processor identifies that the second social media profile is a trusted social media profile based on comparing the second social media profile to one of a predefined profile whitelist or a predefined profile blacklist.

17. The method of claim 10, wherein the processor identifies that the second social media profile is a trusted social media profile based on comparing an identified reputation score value associated with the second social media profile with a predefined minimum reputation score limit value, the communication interface receives a second interaction request destined for the social media platform server, the second interaction request associated with a third social media profile that is associated with the group, and the second interaction request is not allowed based on a second reputation score associated with the third social media profile being below the reputation score limit.

18. A non-transitory computer-readable storage medium, having embodied thereon a program executable by a processor to perform a method for social media interaction management, the method comprising:

receiving an interaction request destined for a social media platform server from a user device that is logged into a first social media profile of the social media platform server, the interaction request identifying at least a second social media profile and a communication type;

accessing a group social media profile associated with a first group;

identifying that the identified second social media profile is a trusted social media profile based on the first and the second social media profile being associated with the first group and based on information included in the group social media profile;

identifying that the identified communication type is a trusted communication type based on the first and the second social media profile being associated with the first group and based on the information included in the group social media profile; and identifying that the interaction request is to be sent to the social media platform server based on the identification that the second social media profile is a trusted social media profile and the identification that the communication type is a trusted communication type.

19. The non-transitory computer-readable storage medium of claim 18, the program further executable to transmit the interaction request to the social media platform server.

20. The non-transitory computer-readable storage medium of claim 18, further comprising instructions executable to receive another interaction request identifying a third social media profile and another communication type, and to block transmission of the interaction request to the social media platform server based on identifying that the third social media profile is not a trusted social media profile or identifying that the another communication type is not a trusted communication type.

* * * * *